United States Patent
Kazmi et al.

(10) Patent No.: US 9,084,150 B2
(45) Date of Patent: Jul. 14, 2015

(54) SIGNALING MECHANISMS FOR NETWORK-RELAY INTERFACE WITH REDUCED OVERHEAD

(75) Inventors: Muhammad Kazmi, Bromma (SE); Yu Qian, Beijing (CN); Yang Hu, Beijing (CN); Yin Liu, Beijing (CN); Jiansong Gan, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 862 days.

(21) Appl. No.: 12/469,752

(22) Filed: May 21, 2009

(65) Prior Publication Data

US 2010/0238854 A1  Sep. 23, 2010

Related U.S. Application Data

(60) Provisional application No. 61/161,932, filed on Mar. 20, 2009.

(51) Int. Cl.
*H04B 7/14*   (2006.01)
*H04W 4/00*   (2009.01)
*H04B 7/00*   (2006.01)
*G06Q 30/00*  (2012.01)
*H04W 24/10*  (2009.01)
*H04B 7/155*  (2006.01)
*H04B 7/26*   (2006.01)
*H04W 28/04*  (2009.01)
*H04W 48/08*  (2009.01)
*H04W 72/04*  (2009.01)
*H04W 72/12*  (2009.01)
*H04W 84/04*  (2009.01)
*H04W 88/04*  (2009.01)

(52) U.S. Cl.
CPC .............. *H04W 24/10* (2013.01); *H04B 7/155* (2013.01); *H04B 7/2606* (2013.01); *H04W 28/04* (2013.01); *H04W 48/08* (2013.01); *H04W 72/04* (2013.01); *H04W 72/1242* (2013.01); *H04W 84/047* (2013.01); *H04W 88/04* (2013.01)

(58) Field of Classification Search
CPC ....................................................... H04B 7/2606
USPC ............................................. 370/327; 455/14
See application file for complete search history.

(56) References Cited

U.S. PATENT DOCUMENTS

| | | | |
|---|---|---|---|
| 2005/0083900 | A1 | 4/2005 | Wanguemert Perez et al. |
| 2006/0122905 | A1* | 6/2006 | Marshall et al. ................ 705/26 |
| 2006/0268764 | A1* | 11/2006 | Harris ........................... 370/328 |

(Continued)

FOREIGN PATENT DOCUMENTS

WO   WO2007075744 A2   7/2007

*Primary Examiner* — Kiet G Tang

(57) ABSTRACT

Relay reporting in a wireless network is implemented by efficiently allocating radio resources based on the nature or criticality of the type of relay report. According to an embodiment, a method of communicating with a relay located in a wireless network includes instructing the relay when to transmit reports based on a mapping of different categories of relay reports to one or more different reporting schemes. Reports are received from the relay based on the relay report category and the corresponding reporting scheme. According to another embodiment, a method of reporting information from a relay to a network node of a wireless network includes generating different categories of reports at the relay for transmission to the network node. A reporting scheme associated with each report category is identified and each report is transmitted to the network node in accordance with the reporting scheme identified for the corresponding report category.

12 Claims, 8 Drawing Sheets

(56) References Cited

U.S. PATENT DOCUMENTS

| | | |
|---|---|---|
| 2007/0168326 A1 | 7/2007 | Das et al. |
| 2009/0197624 A1 * | 8/2009 | Kwak et al. .................. 455/517 |
| 2010/0046396 A1 | 2/2010 | Cai et al. |
| 2010/0260121 A1 * | 10/2010 | Gholmieh et al. ............ 370/329 |

* cited by examiner

US 9,084,150 B2

SIGNALING MECHANISMS FOR NETWORK-RELAY INTERFACE WITH REDUCED OVERHEAD

CROSS REFERENCE TO RELATED APPLICATIONS

This application claims priority benefit under 35 U.S.C. §119(e) from U.S. Provisional Application No. 61/161,932, filed Mar. 20, 2009, which is incorporated herein by reference in its entirety.

TECHNICAL FIELD

The present invention generally relates to relay operation in a wireless network, and more particularly relates to relay control and reporting.

BACKGROUND

A relay is a network node for enhancing the signal quality of the link between a base station and user equipment. The coverage and cell edge data rate can be considerably enhanced by using relays. There are three main categories of relays: layer 1, layer 2 and layer 3 relays. Layer 1 relays, also referred to as advanced repeaters, are expected to be one of the potential technology components for LTE (Long Term Evolution) Advanced which is an enhancement of 3GPP (3rd Generation Partnership Project) LTE. The terms 'relay' and 'repeater' are used interchangeably herein and mean the same thing unless otherwise noted. The main difference between an advanced repeater and a more conventional repeater is that an advanced repeater includes one or several advanced functions, such as frequency-selective amplification and controllability.

Frequency selective repeaters are particularly beneficial in OFDMA (Orthogonal Frequency-Division Multiple Access) systems where typically only part of the cell bandwidth (e.g., a sub-set of resource blocks) is used by one UE (User Equipment) at a time. A frequency selective repeater only amplifies the part of the allocated bandwidth for which there exists an association between UE and the repeater. A layer 2 relay also performs advanced functions such as decoding and correction of data before forwarding the data to the next hop towards UE or an eNodeB (enhanced node B). To enable these advanced functions, typical layer 2 related features such as scheduling, HARQ (Hybrid Automatic Repeat Request), MAC (Media Access Control) etc. are implemented in layer 2 relays. A layer 3 relay performs complete layer 3 related operations such as resource allocation, admission control etc. on the hop between itself and UE or between itself and the eNodeB. This requires the layer 3 relay to implement complete layer 3 protocol aspects in addition to lower layers (e.g., layer 1 and layer 2).

To make a repeater controllable by an eNodeB, a new interface between the eNodeB and the repeater referred to as the X3 interface has been recently introduced. Signaling alternatives for the X3 interface include PDCCH (Physical Downlink Control Channel)/PUCCH (Physical Uplink Control Channel) signaling or L1 signaling, MAC control PDU (Protocol Data Unit) signaling and RRC (Radio Resource Control) signaling. The same signaling alternatives may also apply to other types of relays, e.g. layer 2 and layer 3 relays.

As described above, the main objective of the relay is to improve the link quality so that coverage and cell edge bit rate can be increased without requiring additional base stations. Depending upon the type of relay, the relay is typically controlled, monitored and configured by the base station (e.g., eNodeB in LTE) or other network nodes such as a radio network controller or core network node. Depending upon various factors such as deployment scenario, system load, capacity/throughput targets etc., certain parameters in the relays need to be updated at least on a semi-static basis. Therefore a mechanism is needed that allows the network (e.g. the base station) the possibility to configure and modify the parameters such as threshold levels for the algorithms used at the relay node, even for a frequency selective repeater.

Furthermore, a relay may also encounter problems and experience partial or complete disruption. This has a direct impact on network performance and therefore should be reported to the network. In response, depending upon the severity and the nature of the fault, the network node (e.g. base station) ideally trouble shoots or otherwise rectifies the problem via signaling to the relay. In general the communication between the relay and network node for the purpose of status reporting and configuration is mostly sporadic. In some cases the communication between the relay and network node is not time critical, e.g. when configuring thresholds for a particular algorithm used for amplifying a signal. It is also important that this type of signaling and message exchange between the relay and network node does not adversely impact or disrupt the normal relay operation. For instance, there should be minimal impact on the resources used for normal data or signaling transmission between UE and the base station via the repeater.

Existing UE protocol stacks (L1, MAC or RRC) are conventionally reused for the reporting of faults, etc. by relays. As such, relays are treated as if they were UE for all types of reporting to the network. Reusing the existing UE protocol stacks in this way leads to relatively simpler implementation and may not affect normal traffic between UE and network if done very rarely, e.g. during initial setup of the relay. However, relay configuration (e.g. reconfiguration of the UE-relay association) or reporting by the relay (e.g. error/faults, etc.) is part of the normal relay operation. Furthermore, the traffic/signaling between the eNodeB and relays may differ tremendously compared to that between eNodeB and UE. As such, reusing UE stacks for relays is not efficient enough. For example, if there are many relays frequently communicating with an eNodeB, there will be considerable signaling overhead, e.g. grants and assignments on PDCCH. The PDCCH capacity is quite limited to begin with and therefore at least its frequent use for communicating with relays should be minimized as much as possible. In general the radio resources should be used in a manner so that the impact on normal operation (i.e. between UE and network) is minimal.

As stated above, the signaling exchange between the network and relay for the purpose of configuration, error reporting, etc. is inevitable during relay operation. Such relay-to-network communication is referred to herein as reporting from the relay to the network or simply 'relay reporting'. For the purpose of relay reporting, the use of normal radio resources and channels (e.g. PUSCH, PDCCH, etc.) is unavoidable, but should be minimal to reduce the impact on normal operation between UE and the network.

SUMMARY

According to the methods and apparatus disclosed herein, relay reporting is implemented by efficiently allocating radio resources based on the nature or criticality of the type of relay report. In one embodiment, more critical categories of relay reports have a higher reporting priority than less critical relay reports. In addition, the physical layer channel structure of LTE is fully utilized. That is, no modification of PDCCH, PUSCH etc. is necessary. Broadly, a signaling mechanism is provided for fault and status reporting from relays to the network and for configuration of relays without significantly increasing signaling overhead. Several relay reporting schemes are proposed that reduce control signaling overhead, especially for L1 signaling.

A first relay reporting scheme referred to herein as the "periodical approach" involves periodical signaling between relays and the network, e.g. so that status reports can be periodically sent from relays. Another relay reporting scheme referred to herein as the "event-triggered approach" involves event-triggered signaling between relays and the network, e.g. so that fault reports can be sent from relays. A third approach referred to herein as the "piggyback approach" involves exploring the characteristics of the traffic on the X3 interface or other similar network-to-relay interface which is more predictable than the interface between UE and base stations. Hence, the network can allocate additional resources for relay reporting when the network sends grants (i.e., allocates radio resources) to relays for other purposes. Furthermore the "piggyback approach" can be used by the relay for reporting non-urgent information to the network node (e.g., an eNodeB). A fourth relay reporting scheme referred to herein as the "interstitial scheduling approach" involves assigning resources to a relay for reporting when resources used for normal operation (e.g., between UE and base station) are available in abundance or in other words when resource usage for normal operation is low. These various relay reporting schemes can work independently or complementarily. Another aspect of the invention is to categorize different types of reports (e.g. urgent, occasional, etc.) and report each category according to the most suitable reporting scheme. Such a mapping can be standardized or can be an algorithm in the network.

According to one embodiment, a method of communicating with a relay located in a wireless network includes instructing the relay when to transmit reports based on a mapping of different categories of relay reports to one or more different reporting schemes. Reports are received from the relay based on the relay report category and the corresponding reporting scheme.

According to another embodiment, a method of reporting information from a relay to a network node of a wireless network includes generating different categories of reports at the relay for transmission to the network node. A reporting scheme associated with each report category is identified and each report is transmitted to the network node in accordance with the reporting scheme identified for the corresponding report category.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
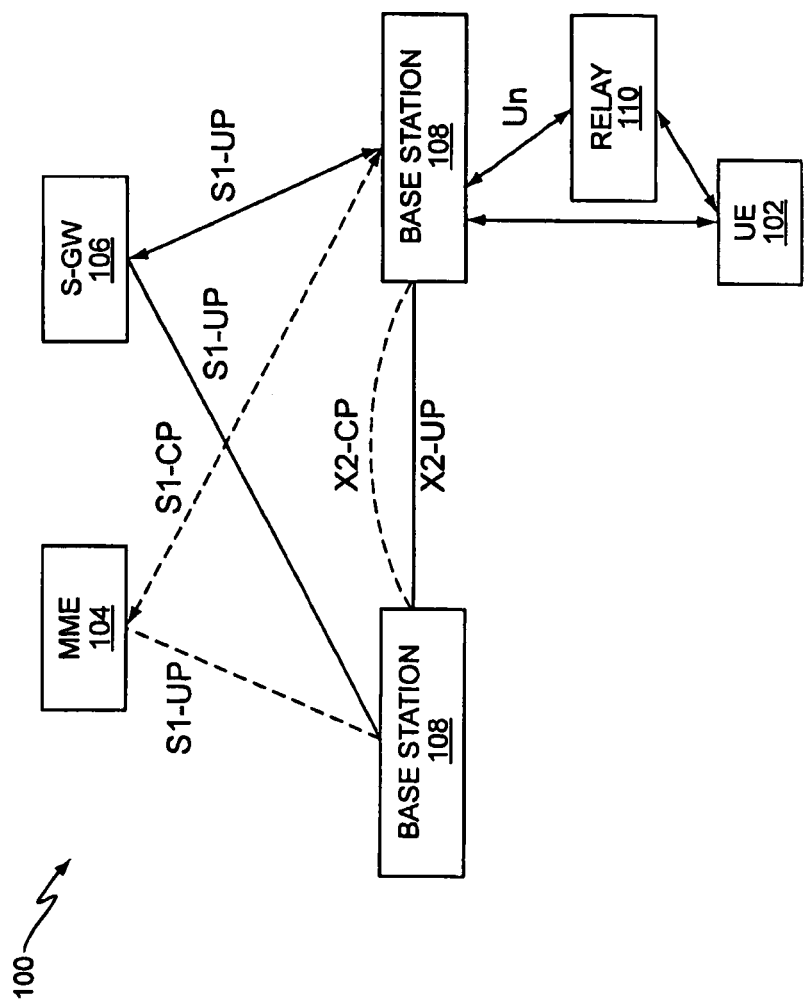
FIG. 1 illustrates a block diagram of an embodiment of a wireless network including a relay.

FIG. 1 illustrates an embodiment of a wireless network 100 for serving UE 102. In one embodiment, the wireless network 100 has a network core such as an LTE evolved packet core and an air interface such as E-UTRAN (Evolved UMTS Terrestrial Radio Access Network). The LTE evolved packet core includes an MME (Mobility Management Entity) 104 which is a control-node for the LTE access-network and handles idle mode UE tracking and paging procedure including retransmissions. The LTE evolved packet core further includes an S-GW (Serving Gateway) 106 for routing and forwarding user data packets. The S-GW 106 also functions as a mobility anchor for the user plane during inter-base station handovers and as an anchor for mobility between LTE and other 3GPP technologies. The air interface of the wireless network 100 includes base stations 108 such as eNodeB and one or more relays 110 associated with each base station 108. Various interfaces such as S1-CP and S1-UP enable communication between the network core and the air interface (i.e., with the base stations). The base stations 108 can communicate with one another over another interface such as the X2 interface (e.g., X2-CP and X2-UP interfaces).

Each relay 110, which can be an advanced repeater in some embodiments, and the corresponding base station 108 communicate over an interface such as the X3 interface. The relay configuration and reporting embodiments described herein can broadly apply to other wireless network technologies and topologies. Thus, while operation of the wireless network 100 is explained next with reference to an eNodeB base station in LTE for ease of explanation, such description is exemplary and non-limiting. Hence, the term "network node" as used herein can refer to an eNodeB in LTE or other type of base station as well as other network nodes such as a radio network controller (not shown) or a core network node (e.g., the MME 104, S-GW 106, etc.).

With this understanding, the eNodeB 108 communicates with the corresponding relay 110 by instructing the relay 110 when to transmit relay reports based on a mapping of different categories of reports to one or more reporting schemes. The eNodeB 108 then receives reports from the relay 110 based on the relay report category and the corresponding reporting scheme. The traffic on the eNodeB-to-relay interface (e.g., X3 interface) has some characteristics, which differ from the traffic and signaling exchanged between UE 102 and eNodeB 108. The network 100 can make use of these characteristics for determining when a particular relay 110 is allocated radio resources for transmitting reports. For example, a relay 110 may need to periodically report its status, e.g. by reporting amplification gain, temperature, etc. This type of relay report is categorized as periodical because of the periodic nature of the reports. The relay 110 may also send fault reports generated when there is a problem with the relay 110. This type of relay report is categorized as event-triggered because of the sporadic nature of the reporting. In yet another example, when the traffic between the relay 110 and corresponding eNodeB 108 is related to signaling, the traffic is more predictable compared with the traffic between UE 102 and eNodeB 108. This type of relay report is categorized as predictable because of the well-defined nature of the reports.

The characteristics of the eNodeB-to-relay interface are particularly associated with an L1 relay, but are also applicable for all types of relays since their principle objective is the same. Various embodiments are described next with focus on repeaters, but these embodiments apply equally for all types of repeaters (i.e., relays). Considering the characteristics of the eNodeB-to-relay interface described above, several relay signaling methods are described separately. Rules can be specified between the network node (e.g., eNodeB 108) and the corresponding relay 110 for mapping the type of relay signaling to a particular type of relay reporting scheme, better optimizing the use of radio resources for relay reporting.

Figure 2:
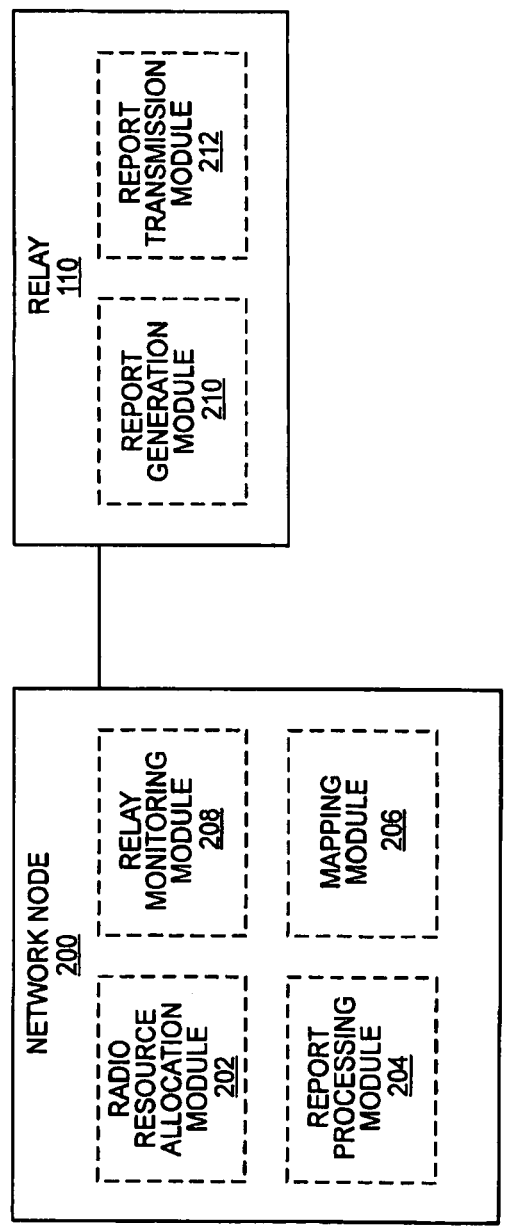
FIG. 2 illustrates a block diagram of an embodiment of a network node that interfaces with a relay in a wireless network.

FIG. 2 illustrates an embodiment of the relay and a network node 200 (e.g., eNodeB 108, etc.) associated with the relay 110. The network node 200 includes a radio resource allocation module 202 and a report processing module 204. The radio resource allocation module 202 instructs the relay 110 when to transmit reports based on a mapping of different categories of relay reports to one or more different reporting schemes. The report processing module 204 processes reports received from the relay 110 based on the relay report category and the corresponding reporting scheme. In some embodiments, the mapping is fixed and predetermined. This way, the mapping can be implemented in a standardized manner. In other embodiments, the network node 200 includes a mapping module 206 for modifying the mapping based on a change in one or more conditions in the wireless network 100 observed by the network node 200. This way, the associations between different types of relay reports and reporting schemes can be modified as the network node 200 observes network activity over time. The network node 200 can further include a relay monitoring module 208 for periodically probing the relay 110 to determine whether the relay 110 has a report ready for transmission. The radio resource allocation module 202, in conjunction with the relay monitoring module 208, can allocate radio resources to the relay 110 when the relay 110 has a report ready for transmission as described in more detail later herein. The relay monitoring module 208 can also detect whether a predefined condition occurs or is expected to occur at the relay 110. This way, the radio resource allocation module 202 can allocate radio resources responsive to the relay monitoring module 208 detecting a predefined condition at the relay 110 so that the relay 110 can report information relating to the predefined condition if the predefined condition occurred also as described in more detail later herein.

The relay 110 has a report generation module 210 and a report transmission module 212. The report generation module 210 generates different types of reports for transmission to the network node 200. The report transmission module 212 identifies a reporting scheme associated with each category of report and transmits each report to the network node 200 in accordance with the reporting scheme associated with the corresponding report category. In some embodiments, the report transmission module 212 accesses a mapping received from the network node 200 that maps each report category to one or more reporting schemes. The report transmission module 212 uses this mapping to determine which reporting scheme is to be used for each particular report type. In one embodiment, the mapping is based on a criticality associated with each category of report so that more critical reports have a higher reporting priority than less critical reports.

Described next in more detail are various embodiments of the relay reporting schemes which can be signaled from the network node 200 to the corresponding relay 110 for use by the relay 110 in signaling reports back to the network node 200. A first one of the relay reporting schemes is referred to herein as the "periodical approach" and involves periodical signaling between the relay 110 and the corresponding network node 200 so that status reports can be periodically sent from the relay 110 to the network node 200. The periodical approach is intended mainly for periodical signaling between the relay 110 and network node 200. In one embodiment, the network node 200 (e.g. eNodeB 108) periodically probes the relay 110 to inquire whether there is anything for the relay 110 to report back to the network 100. When the relay 110 has something to report, suitable radio resources are granted to relay reporting. In one embodiment, the resources allocated for relay reporting are for Physical Uplink Shared Channel (PUSCH). This embodiment allows more effective control of the uplink resources since the resources are assigned periodically on demand or as-needed basis. This embodiment does however require downlink transmission e.g. PDCCH and a resource allocation phase.

Figure 3:
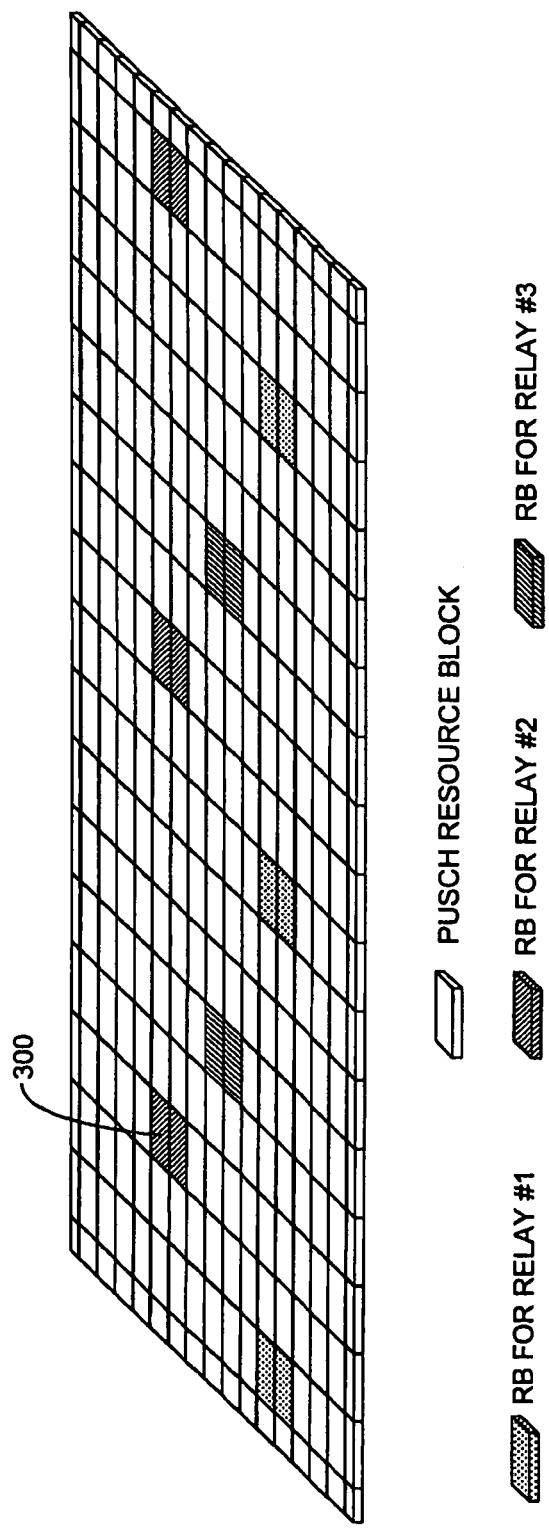
FIG. 3 illustrates an embodiment of a periodical relay reporting scheme.

FIG. 3 illustrates another embodiment of the "periodical" relay reporting scheme where at least some resources for periodical relay reporting are reserved in advance. The network node 200 (e.g. eNodeB 108) reserves periodical PUSCH resources blocks 300 for the corresponding relay 110 and informs the relay 110 about the resources with higher layer signaling. The notification can be done at initial setup of the relay 110. The assignment of periodical resources can be reassessed from time-to-time by the network node 200 at infrequent intervals. For instance, if the network node 200 notices that relay reports are not fully utilizing all or most of the allocated resources, the amount of resources assigned to the relay 110 can be reduced or the periodicity of reporting can be extended. While FIG. 3 shows periodical PUSCH resources blocks 300 being allocated to at least three different relays 110, the network 100 can reserve periodical radio resources for any number of relays 110 included in the network 100. The second embodiment of the "periodical" relay reporting scheme enables the relay 110 to report using reserved resources, without the intervention of PDCCH.

Figure 4:
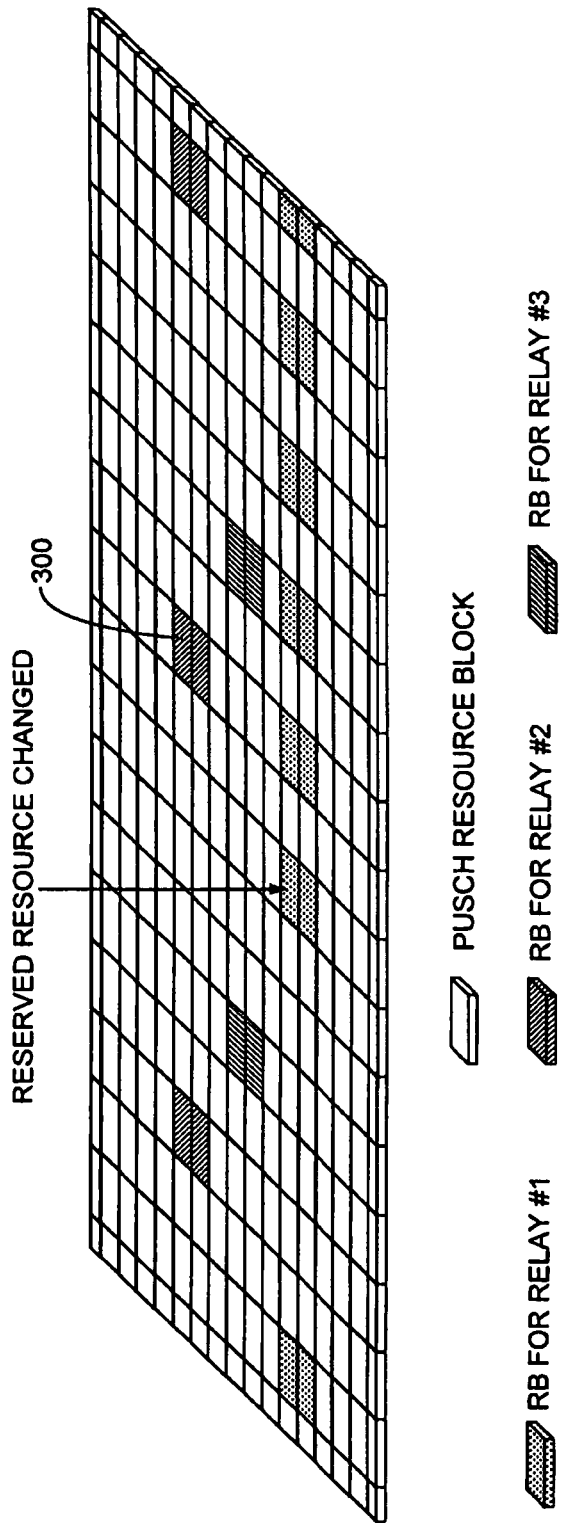
FIG. 4 illustrates another embodiment of a periodical relay reporting scheme.

FIG. 4 illustrates an embodiment of the second "periodical" relay reporting scheme. According to this embodiment, the amount of reserved resources allocated to each relay 110 is adapted according to the amount of information to be reported to the corresponding network node 200. The network node 200 can update the reserved resources by reconfiguring the relay 110 via higher layer signaling. The second embodiment of the "periodical" relay reporting scheme does not require a grant on PDCCH, and hence PDCCH resources are saved. However, some PUSCH resources can go unused if the relay 110 has nothing to report or if resource utilization is low.

Figure 5:
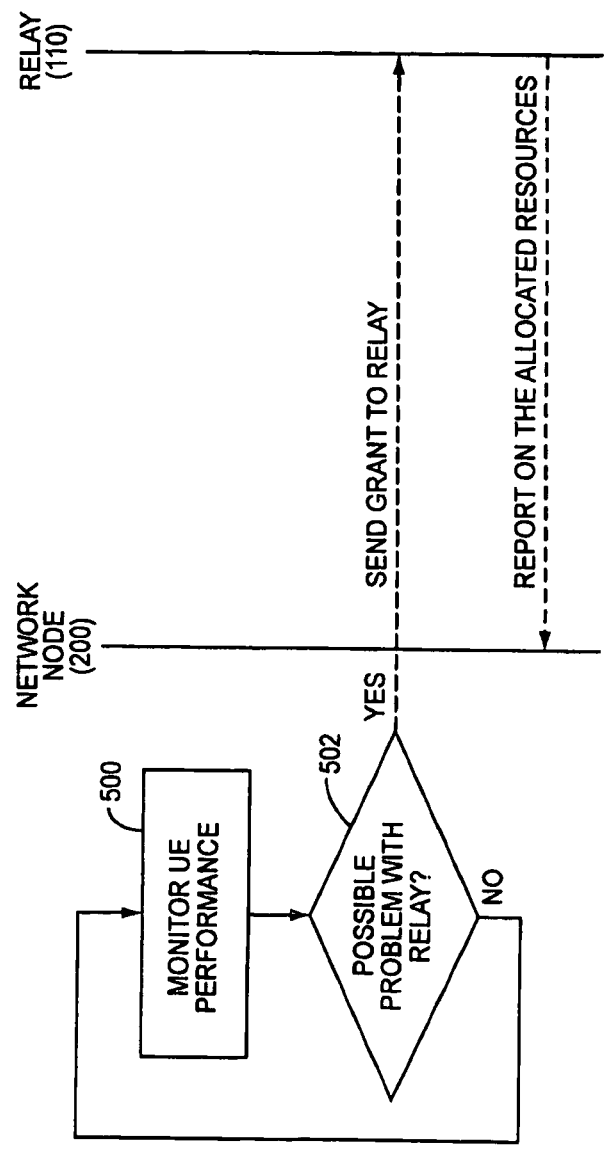
FIG. 5 illustrates an embodiment of an event-triggered relay reporting scheme.

FIG. 5 illustrates an embodiment of another relay reporting scheme referred to herein as the "event-triggered approach" which involves event-triggered signaling between the relay 110 and the corresponding network node 200 so that fault reports can be sent from the relay 110 responsive to the occurrence of a particular event. According to this embodiment, the network node 200 (e.g. eNodeB 108) detects autonomously whether a predefined condition occurs or is expected to occur at the relay 110 (Step 500). In such a scenario, the network node 200 allocates radio resources to the relay 110 so that the relay 110 can report information relating to the predefined condition if the predefined condition occurred (Step 502). In one embodiment, the eNodeB 108 assigns an uplink grant to the relay 110 for reporting the failure or problem or any other predefined error condition.

According to one embodiment of the "event-triggered approach", relay and UE location is determined by the network 100 based on the direction of arrival (DOA) of signal, path-loss and/or round trip time (RTT). If the received signal qualities of the UE 102 around a particular relay 110 are below a certain threshold, then either association (between UE 102 and relay 110) is not good enough or a possible problem has occurred with the relay 110. In response, the responsible network node 200 can send an uplink grant to the relay 110 and request the relay 110 to report about the incident. In cases of a technical fault, the relay 110 reports the fault to the requesting network node 200. The report may comprise a predefined message mapped to a particular type of fault. Otherwise, the relay 110 indicates there is no technical fault or error by sending a predefined message (e.g. 'normal operation').

A modification can be made to the "event-triggered approach" when a severe fault occurs at the relay 110. This reporting scheme is referred to herein as the "event-triggered periodical approach." In the event of a severe fault, regular or periodical reports may be needed or desired from the relay 110 to obtain sufficient and necessary feedback so that problem can be properly understood and rectified by the network 100. As such, periodic radio resources can be allocated to the relay 110 after a severe relay fault is detected so that the affected relay 110 can periodically report information associated with the severe fault.

Figure 6:
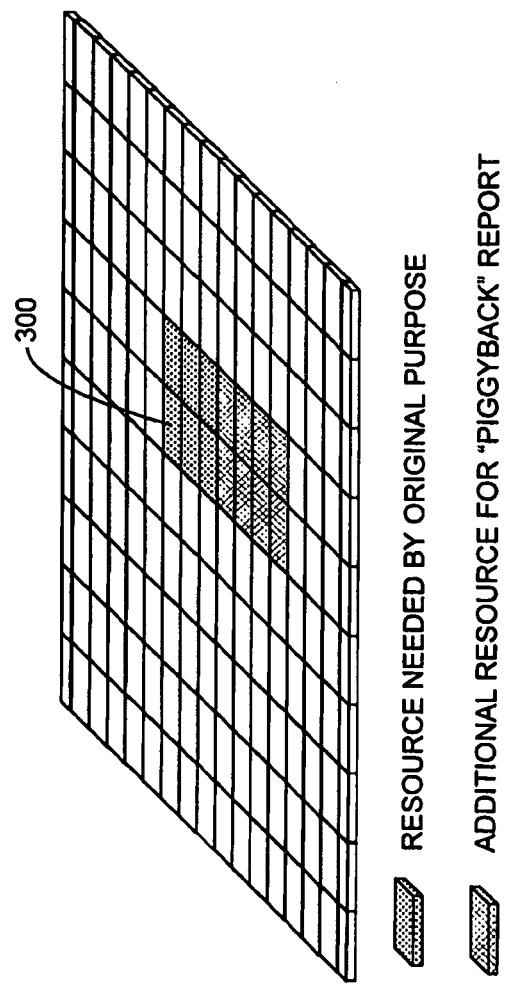
FIG. 6 illustrates an embodiment of a piggybacked relay reporting scheme.

FIG. 6 illustrates an embodiment of yet another relay reporting scheme referred to herein as the "piggyback approach" which involves allocating additional resources for relay reporting when the network 100 sends grants (i.e., allocates radio resources) to a relay 110 for other purposes. According to one embodiment of the "piggyback approach", the network node 200 (e.g. eNodeB 108) sends an uplink grant to a certain relay 110 for a specific purpose and also assigns additional resources to the same relay 110 for reporting. Additional uplink grants are assigned when the network 100 is able to predict whether a particular relay 110 is expected to report something to the network 100. The network 100 may also be able to judge a priori the nature, type and the amount of the expected relay reports. If some additional reports are needed or desired, the network node 200 allocates additional resources beyond which are required by the original purpose. Accordingly, whenever there is an uplink grant and the grant is big enough, there is still room left for additional reports. The resources allocated in accordance with this approach are illustrated in FIG. 6.

According to another embodiment of the "piggyback approach", the network node 200 (e.g. eNodeB 108) configures a particular relay 110 from time to time, e.g. by signaling some UE lists to the relay 110 for establishing a UE-repeater association. This type of configuration takes place via higher layer signaling, e.g. via RRC signaling which typically requires reliable transfer of data. The reliable data transfer requires the use of acknowledged mode RLC. This means the reverse channel (e.g., PUSCH) is used to send back RLC level ACK/NACK (Acknowledgement/No Acknowledgement) or other type of status reporting. Hence the network node 200 can allocate a slightly larger uplink grant to account for relay reporting via the "piggyback approach". The relay 110 can then reuse the grant for reporting and thus no extra PDCCH overhead is needed.

Figure 7:
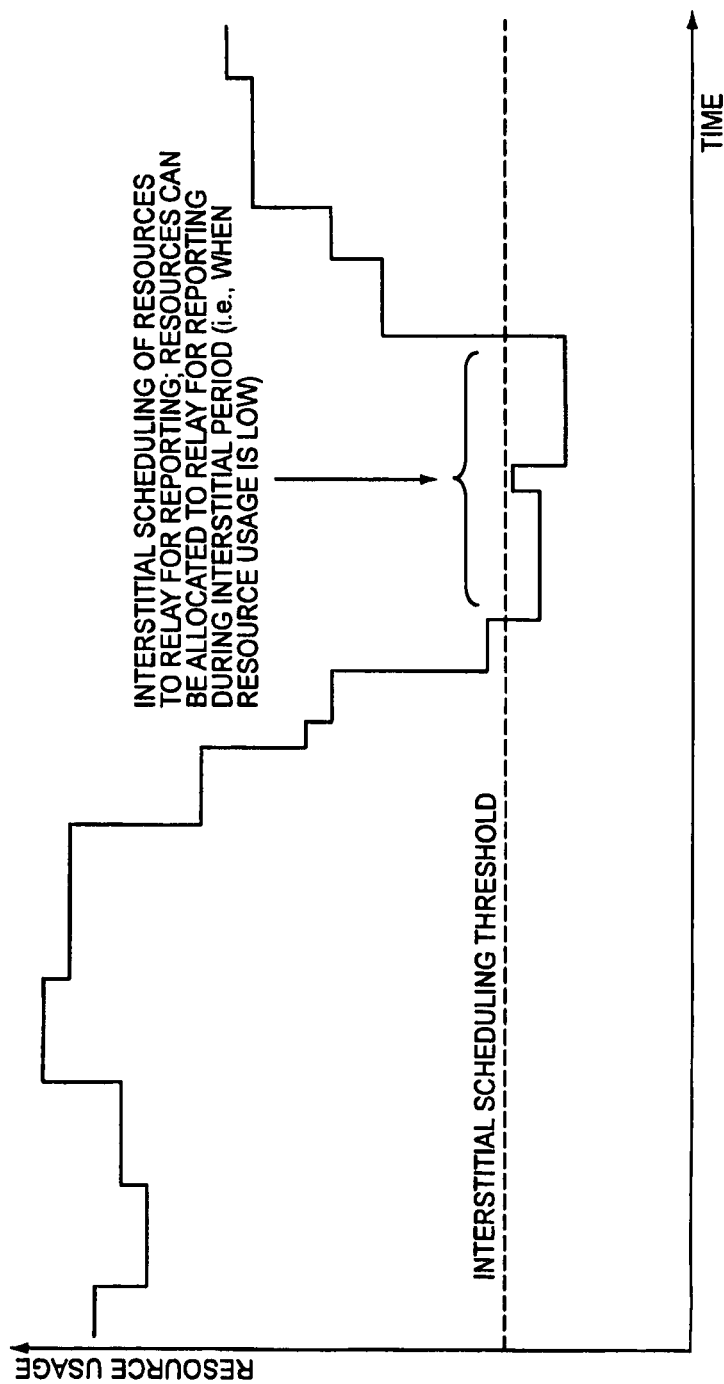
FIG. 7 illustrates an embodiment of an interstitial relay reporting scheme.

FIG. 7 illustrates an embodiment of a relay reporting scheme referred to herein as the "interstitial scheduling approach" which involves assigning resources to a relay 110 for reporting when resources used for normal operation (e.g., between UE 102 and base station 108) are available in abundance or in other words when resource usage for normal operation is low. According to this embodiment, the network 100 grants uplink resources to the relay 110 for reporting when the usage of uplink resources for normal operation (i.e. for transmission between UE 102 and network 100) is very or below a certain threshold. Such conditions typically occur when the network load is low. The allocation of an uplink grant to the relay 110 therefore does not impact or only minimally impacts the normal network operation. The term 'interstitial scheduling' as used herein means scheduling a relay 110 for possible reporting when there is a lull in normal data (or signaling) transmission. The assigned uplink grant for relay reporting depends upon the amount of available resources and the impact the uplink grant has on normal operation.

In addition, the duration of interstitial scheduling preferably depends upon the period of low activity of normal operation. Such periods of low network activity are typically sporadic and last for a short period of time, e.g. a few transmission time intervals (TTI). When the "interstitial scheduling approach" is employed, a relay 110 can transmit outstanding reports (e.g. possible faults, erroneous operation etc). In some embodiments, the corresponding network node 200 can instruct the relay 110 to transmit more urgent reports during a period of low network activity using the radio resources allocated to the relay prior to transmitting less urgent reports. As stated above, the criterion to initiate the interstitial scheduling for enabling relay reporting is in general based on the currently used resources. Specifically, the initiation of the interstitial scheduling scheme can be based on resource block usage or received/transmit power or some combination thereof.

In yet another embodiment, relay reporting can be based on proactive resource assignment where a network node 200 assigns uplink resources to a particular relay 110 at any time when convenient. This differs from other schemes such as the "piggyback approach" and the "interstitial scheduling approach" in that the proactive assignment can be done anytime regardless of any specific condition.

The network node 200 assigned to each relay 110 handles mapping between the relay reporting schemes and different categories of relay reports. The mapping can be fixed and predetermined or changed responsive to a change in one or more conditions associated with the wireless network 100 as previously described herein. The mapping can either be standardized or can be an algorithm in the network node 200 (e.g. eNodeB 108). An established mapping ensures more effective use of the reporting methods described herein for different types of relay reports.

Groups of different types of possible relay reports are first grouped into respective categories. Table 1 below illustrates some exemplary report categories with different types of relay reports. The report categories can have varying degrees of criticality, i.e. importance or urgency. For example, a severe and urgent relay report for indicating the disruption of an important relay component is more critical than an occasional and non-urgent relay report for indicating that a maximum power limit has been reached. The different categories of relay reports are then mapped to one or more particular reporting schemes.

TABLE 1

| No. | Relay Report Category | Relay Report Type |
|---|---|---|
| 1 | Periodical/regular | Amplification gain, temperature |

TABLE 1-continued

| No. | Relay Report Category | Relay Report Type |
| --- | --- | --- |
| 2 | Occasional and urgent | Faults and error disrupting partial or complete operation |
| 3 | Predictable and urgent | Improper UE - relay association |
| 4 | Occasional but non urgent | Reaching maximum power limit |
| 5 | Predictable but non urgent | Incorrect threshold levels used for amplification |
| 6 | Severe and urgent | Disruption of important component of relay |

In one embodiment, a one-to-one mapping is provided between relay report category and reporting scheme. Thus, each category of relay report is associated with a unique reporting scheme. Table 2 provides an example of mapping the relay report categories to reporting scheme based on the first embodiment, i.e. a one-to-one mapping.

TABLE 2

| No. | Relay Report Category | Relay Reporting Scheme |
| --- | --- | --- |
| 1 | Regular and time critical | Periodical Approach |
| 2 | Occasional and urgent | Event-triggered Approach |
| 3 | Predictable and urgent | Event-triggered Approach |
| 4 | Occasional but non urgent | Piggyback Approach |
| 5 | Predictable but non urgent | Piggyback Approach |
| 6 | Any type; urgent first | Interstitial Scheduling Approach |
| 7 | Severe and urgent | Event-triggered Periodical Approach |

Figure 8:
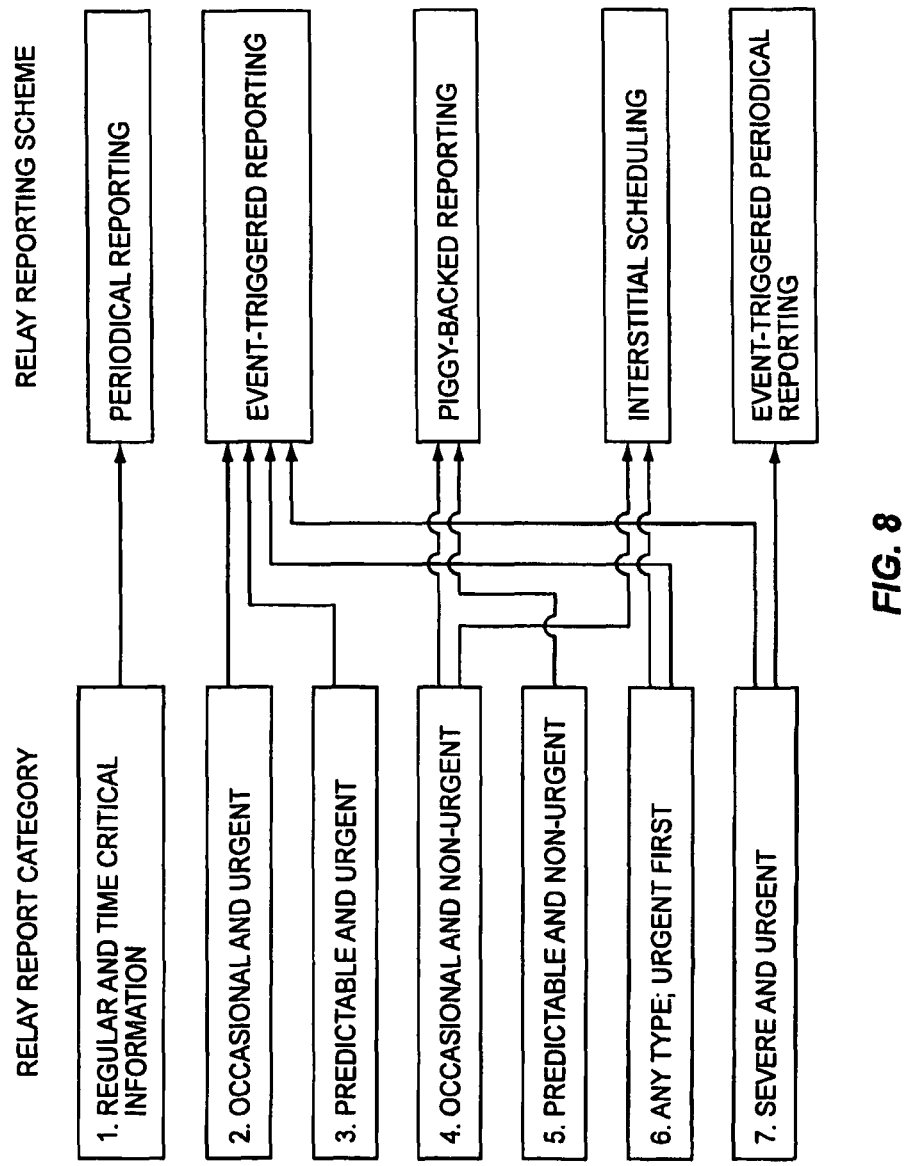
FIG. 8 illustrates an embodiment of a mapping of relay report categories to relay reporting schemes.

FIG. 8 illustrates a second embodiment where more than one reporting scheme can be mapped to the same category of relay report. According to this embodiment, certain report categories (e.g. categories 4, 6 and 7 in FIG. 8) can be sent by using more than one reporting mechanism. In either embodiment, the mapping of report category to reporting scheme can be based on a criticality associated with each category of relay report so that more critical reports have a higher reporting priority than less critical reports. For example, any of the urgent categories of relay reports can be mapped to the "event-triggered" reporting scheme so that urgent relay reports receive top priority for radio resources, e.g., as shown in Table 2 and FIG. 8. Less critical relay report types can be mapped to a reporting scheme having a lower priority such as the "piggyback approach" also as shown in Table 2 and FIG. 8. By employing the proposed relay reporting schemes, L1 control signaling can be kept low when relays 110 report information to the network 100. In addition, the impact on the usage of resources for normal operation between the network 100 and UE 102 is reduced since resources allocated for relay reporting are assigned according to well established rules.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of communicating with a relay located in a wireless network, the method comprising:
   identifying a period of low user equipment transmission activity where an amount of radio resources allocated for user equipment transmissions falls below a certain threshold;
   allocating radio resources to the relay during the period of low user equipment transmission activity so that the relay can transmit one or more reports during this period;
   instructing the relay when to transmit reports based on a mapping of different categories of relay reports to one or more different reporting schemes; and
   receiving reports from the relay based on the relay report category and the corresponding reporting scheme.

2. The method of claim 1, wherein the mapping is fixed and predetermined.

3. The method of claim 1, comprising modifying the mapping based on a change in one or more conditions associated with the wireless network.

4. The method of claim 1, wherein at least one of the categories of relay reports is mapped to more than one of the reporting schemes.

5. The method of claim 1, wherein the mapping is based on a criticality associated with each category of relay report so that more critical relay reports have a higher reporting priority than less critical relay reports.

6. The method of claim 1, comprising:
   periodically probing, the relay to determine whether the relay has a report ready for transmission; and
   allocating radio resources to the relay when the relay has a report ready for transmission.

7. The method of claim 1, comprising:
   reserving periodical radio resources for use by the relay in transmitting reports; and
   informing the relay of the reserved periodical radio resources.

8. The method of claim 7, comprising reassessing the amount of periodical radio resources reserved for the relay based on prior utilization of the periodical radio resources by the relay for transmitting reports.

9. The method of claim 1, comprising:
   detecting whether a predefined condition occurs or is expected to occur at the relay; and
   allocating radio resources to the relay responsive to detecting the predefined condition so that the relay can report information relating to the predefined condition if the predefined condition occurred.

10. The method of claim 9, wherein the predefined condition corresponds to a severe fault at the relay and the radio resources are periodically allocated so that the relay can periodically report information associated with the severe fault.

11. The method of claim 1, comprising allocating radio resources to the relay for as particular purpose and additional radio resources that are unnecessary for the specific purpose so that the relay can transmit one or more reports using the additional allocated resources.

12. The method of claim 1, comprising instructing the relay to transmit more urgent reports using the radio resources allocated to the relay prior to transmitting less urgent reports.

* * * * *

UNITED STATES PATENT AND TRADEMARK OFFICE
CERTIFICATE OF CORRECTION

| | | |
|---|---|---|
| PATENT NO. | : 9,084,150 B2 | Page 1 of 1 |
| APPLICATION NO. | : 12/469752 | |
| DATED | : July 14, 2015 | |
| INVENTOR(S) | : Kazmi et al. | |

It is certified that error appears in the above-identified patent and that said Letters Patent is hereby corrected as shown below:

In the Claims

In Column 10, Line 29, in Claim 6, delete "probing," and insert -- probing --, therefor.

In Column 10, Line 53, in Claim 11, delete "for as" and insert -- for a --, therefor.

Signed and Sealed this
Twenty-ninth Day of December, 2015

Michelle K. Lee
*Director of the United States Patent and Trademark Office*